Oct. 28, 1958     F. J. HANZEL ET AL     2,857,624
CONTINUOUS DENSIFICATION OF THERMOSETTING POWDER
Filed July 19, 1956
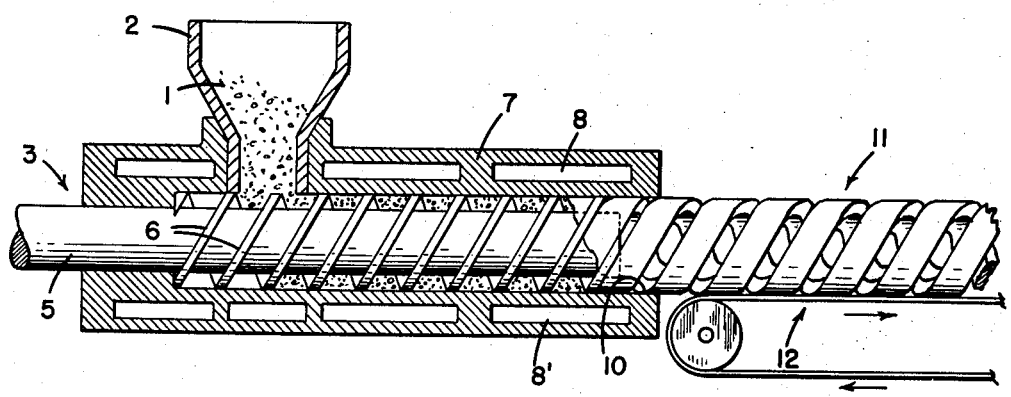

United States Patent Office 2,857,624
Patented Oct. 28, 1958

2,857,624

CONTINUOUS DENSIFICATION OF THERMOSETTING POWDER

Francis J. Hanzel, Lester M. Redgrave, and Marshall R. Howard, Fredericksburg, Va., assignors to American Viscose Corporation, Philadelphia, Pa., a corporation of Delaware Application July 19, 1956, Serial No. 598,832

9 Claims. (Cl. 18—47.5)

This invention relates to a process for the manufacture of thermosetting aminoplastic molding compositions in granular form, and more particularly, to a continuous process for making such compositions. The invention is especially adapted to the manufacture of urea-formaldehyde and melamine-formaldehyde molding compositions.

Because of the fact that molding compositions in powder form are difficult to mold, it is common practice in the prior art to compact the powder into granules before molding. The resulting granular material may be readily handled since it is a free-flowing, non-dusty material. It is readily pressed into preforms, or it may be molded directly, if desired. Heretofore, aminoplastic molding compositions have been made in granular form by densifying an aminoplastic resin molding powder in a Banbury mixer, and then granulating the resulting material in a revolving blade cutter. This process is, of course, a batch operation since only a small amount of the aminoplast powder can be charged into the Banbury mixer at one time. This requires a considerable amount of labor; also the product is frequently non-uniform.

Another method of making granular material involves heating an aminoplast molding powder on hot rolls, forming a sheet of the heated powder by passing it through pressure rolls, stripping the sheet from the rolls, and granulating it in a rotary blade cutter. One disadvantage of this process is that the aminoplast powder is not uniformly heated, and the product, is, therefore, not uniform. Furthermore, because of the difference in density of the powder at various points on the rolls, a different degree of compression is obtained. The most serious difficulty is that the sheet coming from the rolls has a very high ratio of surface area to volume. All of this surface material is more highly densified or polymerized than the interior material. The result is that the granular molding powders produced from such a sheet frequently give moldings having a mottled, non-uniform appearance, sometimes called an "orange peel" surface.

A more recent and patented process consists of heating a finely ground aminoplast molding powder while maintaining it in a loose, uncompacted condition and preferably with agitation to a temperature of about 45–80° C., feeding the heated powder directly into a briquetting machine and forming briquettes under a pressure of 5,000–25,000 pounds per square inch, immediately granulating the resulting briquettes while hot to form granules of 10–80 mesh, and then cooling the granular material to below 45° C. The objection to this process is the difficulty of uniformly heating the powder without causing wide variations in density of the heated powder and without pre-curing, that is, overheating a portion of it. To attain a steady output of heated powder it is necessary to maintain a large temperature differential between the heat source and the powder, for example, if the powder is passed through a heated can the internal surface of the can might have to be 100° C. in order to heat the powder to 70° C., within a reasonable length of time. Such a large temperature differential often causes the powder to become adhesive and to stick to the sides of the heating chamber forming a coating which in turn becomes pre-cured. On the other hand, if the temperature differential between the powder and the heating surface is small, an excessive amount of time is required for heating the powder to the desired temperature.

From the foregoing it can be seen that it would be desirable to have a substantially continuous process of making a granular aminoplastic molding composition which would avoid the difficulties encountered by the use of the previously known methods. It is, therefore, an object of the present invention to provide a process for the manufacture of granular molding compositions which is continuous so as to avoid the difficulties encountered in the batch process, wherein the Banbury mixer is used, and which also avoids the difficulties encountered in the continuous processes employing either the heated roll or the briquetting of heated powder.

This object is attained in the present process by extruding the thermoplastic powder through a simple helical screw-type extruder operating in a close-fitting heated cylinder having no die or receptive orifice at the discharge end thereof. This eliminates any pressure build-up which would tend to cause curing or thermo-seting of the powder. The powder is introduced at one end of the screw or auger, which revolves in the heated cylinder and serves the double function of pressing the powder into a continuous worm-shaped extrudate and pushing this out onto a receiver. The extrusion chamber is necessarily heated somewhat, for example to around 70° C., by the use of electric band heaters but the space between the auger and the side wall of the enclosing cylinder is so limited that none of the powder can stick to the cylinder wall as a film and thus become cured. Instead it is rolled steadily forward by the helical advancement of the auger, emerging as a compact continuous helical worm. This extrudate consists simply of densified powder, no curing or thermosetting has taken place. This is then cut into preferably about 10 mesh granules while the extrudate is still hot so as to reduce the formation of powder. The resulting granules are then cooled. In this condition they are now ready for molding.

This process can be easily illustrated by the drawing which is a side view of the extrusion device. Referring to the figure, the fine fluffy powder 1 is charged into hopper 2 which feeds into auger 3 which comprises a simple shaft 5 carrying helices 6 and rotating within cylindrical casing 7. Heat is applied to the cylinder by the use of band heaters illustrated at 8, 8'. These may be simply helical resistance heaters or may be any other means of controlled heating such as circulating hot oil or hot water. Adequate control should be placed on the heat source whether it be by gas, oil, water, or electricity in order to avoid local overheating. Extrusion cylinder 7 is open at the forward end 10 permitting the extrudate to discharge as a continuous helical worm 11 directly onto a conveyor belt 12 or other suitable transport means. This is then cut into granules and cooled by means not shown but conventional in the prior art as already pointed out above. Any granules over 12 mesh are usually recycled to the cutter; the powder, if any, is sieved out and recycled to the extruder.

It has been found desirable to have the worm or screw highly polished in order to allow proper slippage along the flights for efficient operation and self-cleaning. While various types of flight design have been operated successfully, one that has a thread depth of from $3/16$ of an inch to 1 inch with the depth uniform and densification being effected by reduced pitch has been found most effective.

So far is as known the only use of a helical type extruder in this art has been for the purpose of forming a thermally set and cured extrudate, in short, a molded article. In these cases however the outlet end of the auger extruder always comprises a die plate, the orifices of which restricts the flow of the plastic therethrough causing a considerable pressure build-up within the auger. This pressure may range from 1,000 to 10,000 p. s. i., or even 50,000 p. s. i., or more depending on the material and design of equipment. At the same time the temperature of the extruder is held above the thermosetting temperature of the composition; this combination of heat and high pressure produces a thermally set molded extrudate, the shape of which is controlled by the design of the die orifice. In this manner there can be formed rods, hose, split tubing for subsequent spreading into sheets, etc. It must be emphasized that the purpose of the aforesaid type of extruder is to produce a finished or substantially finished molded article, whereas in applicant's case the purpose and function of the extrusion process is to produce an uncured densified thermoplastic powder suitable for molding. In short, applicant's extrusion process operating below the thermosetting temperature and with no back-pressuring means produces a continuous worm which when cut and granulated produces granules of uniform density free of precuring. This is now the raw material for the plastic molding industry, which forms this material into shaped articles by curing in a hot mold. They may, for example, be used for molding buttons, clock cases, radio cabinets, dishes, various household utensils and other articles. It may also be used as the raw material for extruded molded products of the type described above, i. e., hose, split tubing, etc.

The present invention is applicable to any thermosetting aminoplast resin, and includes the aminotriazine-aldehyde resins (such as melamine-formaldehyde resins, benzoguanamine-formaldehyde resins, acetoguanamine-formaldehyde resins, etc.), dicyandiamide-aldehyde resins, urea-formaldehyde resins, mixed melamine-urea-formaldehyde resins, mixed thiourea-urea-formaldehyde resins, urea-aldehyde-ether, melamine-aldehyde ether, etc. In the manufacture of the molding powders, various curing catalysts may be incorporated, such as those normally used in the art. These include acids, such as phthalic acid or phthalic anhydride, maleic acid, etc. Furthermore, salts may be used, such as diammonium phosphate, triethanolamine phthalate, etc. Any of the compositions may be buffered with alkaline materials, such as free urea, melamine or hexamethylene tetramine. Suitable mold lubricants may be incorporated in the compositions, such as zinc stearate, calcium stearate, etc.

Generally, it is preferred to use alpha cellulose pulp as the filler, but various other fillers may be used if desired, including wood flour, paper fibers, cotton fibers, asbestos fibers, nylon fibers, glass fibers, etc. Aside from using fibers as such, they may be used in woven form or in the form of spun threads. In such cases the fabrics or threads are generally cut in relatively small pieces.

The molding compositions may contain any suitable dyes or pigments in order to obtain various colors, ranging from the pastel colors to black.

We claim:

1. Process of converting a thermosetting aminoplastic powder into granules suitable for use in molding comprising feeding said powder in dry finished form into a compression zone comprising a helical screw rotating in a close fitting cylinder open without restriction at the forward end, advancing the powder continuously through the cylinder by rotation of the screw whereby the powder is compacted into a continuous helical worm, the temperature and pressure on the powder during its advancement through the cylinder being insufficient to cause fusion or thermal setting of the powder, cutting the extrudate after its discharge from the cylinder into granules, and subsequently molding the granules by a combination of heat and pressure into a rigid thermally set molded article.

2. A process of compacting and densifying a finely divided thermosetting aminoplastic molding powder which comprises heating said powder in dry finished form to a temperature of about 45–80° C., said temperature being below the thermal setting temperature of the powder, simultaneously extruding the heated powder through a cylinder by means of a screw, said cylinder being open without restriction at the forward end, wherein the individual particles are packed together into a continuous helical worm but without curing or thermal setting thereof, and continuously withdrawing as an extrudate at the outlet end of the helical screw said compact helical worm.

3. Process of claim 2 wherein the extrudate is continuously granulated into particles of a size suitable for subsequent molding into plastic articles.

4. Process of claim 3 wherein the granulation is effected while the extrudate is still hot, and the resulting granules are then cooled.

5. Process of converting a thermosetting aminoplastic powder into granules suitable for subsequent molding comprising feeding said powder in dry finished form into one end of a horizontal screw revolving in a heated cylinder open without restriction at the forward end, rotating the screw so as to advance the powder through the cylinder to the open end thereof whereby the compression of the powder between the screw and the cylinder side wall compacts it into a continuous helical worm, maintaining the temperature of the powder during its advancement through the cylinder at a value insufficient to effect fusion or thermosetting of the powder, and continuously withdrawing the resulting extrudate from the open end of the cylinder.

6. Process of claim 5 wherein the powder is a urea-formaldehyde resin molding powder.

7. Process of claim 5 wherein the powder is a melamine-formaldehyde resin molding powder.

8. Process of claim 5 wherein the powder is a thiourea-formaldehyde resin molding powder.

9. Process of claim 5 wherein an acidic curing catalyst is incorporated into the powder fed to the screw.

References Cited in the file of this patent

UNITED STATES PATENTS

| | | |
|---|---|---|
| 693,750 | Smith | Feb. 18, 1902 |
| 1,690,784 | Hilgers | Nov. 6, 1928 |
| 2,125,776 | Ellis | Aug. 2, 1938 |
| 2,143,413 | Ellis | Jan. 10, 1939 |
| 2,309,342 | Dent et al. | Jan. 26, 1943 |
| 2,566,854 | Rhodes | Sept. 4, 1951 |